(12) United States Patent
Tasaka

(10) Patent No.: US 7,456,919 B2
(45) Date of Patent: Nov. 25, 2008

(54) OPTICAL FILM, IMAGE DISPLAY DEVICE, AND LIQUID-CRYSTAL DISPLAY DEVICE

(75) Inventor: Tomoki Tasaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 283 days.

(21) Appl. No.: 11/507,459

(22) Filed: Aug. 22, 2006

(65) Prior Publication Data
US 2007/0046871 A1 Mar. 1, 2007

(30) Foreign Application Priority Data
Aug. 23, 2005 (JP) ............................. P2005-240967

(51) Int. Cl.
*G02F 1/1335* (2006.01)
(52) U.S. Cl. ........................... 349/118; 349/117; 349/96
(58) Field of Classification Search ................. 349/117, 349/193, 194, 181, 118, 122, 96, 104, 126, 349/141
See application file for complete search history.

(56) References Cited

U.S. PATENT DOCUMENTS 7,019,804 B2 * 3/2006 Kumagai et al. ............. 349/117
7,023,505 B2 * 4/2006 Sakamaki et al. ............. 349/96
2005/0200792 A1 * 9/2005 Jeon et al. .................... 349/141
2006/0098146 A1 * 5/2006 Yano et al. ................... 349/118
2006/0285051 A1 * 12/2006 Jeon et al. .................... 349/141
2007/0002233 A1 * 1/2007 Yano et al. ................... 349/117
2007/0046871 A1 * 3/2007 Tasaka ........................ 349/118

FOREIGN PATENT DOCUMENTS

JP          2005-99476 A      4/2005    ............. 349/117 X

* cited by examiner

*Primary Examiner*—Brian M Healy
(74) *Attorney, Agent, or Firm*—Sughrue Mion, PLLC

(57) ABSTRACT

An optical film includes: a polarizer having an absorption axis; and at least three retardation films, each having a slow axis, wherein the absorption axis of the polarizer intersects the slow axis of each of the at least three retardation films at right angles and is parallel to the slow axis of each of the at least three retardation films, the slow axis of each of the at least three retardation films are parallel to each other, a total amount of Nz value of each of the at least three retardation films, the Nz value being defined by formula (I), is half as many as the number of the at least three retardation films, and an in-plane retardation $Re_1$ of each of the at least three retardation films, the in-plane retardation $Re_1$ being defined by formula (II), ranges from 200 to 350 nm:

$$Nz = (nx_1 - nz_1)/(nx_1 - ny_1) \quad (I)$$

$$Re_1 = (nx_1 - ny_1) \times d_1. \quad (II)$$

9 Claims, 16 Drawing Sheets

FRONT VALUE

OPTICAL FILM, IMAGE DISPLAY DEVICE, AND LIQUID-CRYSTAL DISPLAY DEVICE

BACKGROUND OF THE INVENTION

1. Field of the Invention

The present invention relates to an optical film having a polarizer and at least three phase-difference films laminated thereon.

2. Background Art

A liquid-crystal display device of so-called TN mode, where liquid crystal having a positive dielectric anisotropy is twisted and horizontally aligned between mutually-opposing substrates, has hitherto been primarily used as the liquid-crystal display device. However, even when an attempt is made to display black in the TN mode, birefringence is induced by liquid crystal molecules in the vicinity of the substrates because of a driving characteristic of the liquid-crystal display device. As a result, leakage of light arises, to thereby pose difficulty in displaying perfect black. In contrast, in a liquid-crystal display device of IPS mode, liquid crystal molecules exhibit, in an inoperative state, homogeneous alignment where liquid-crystal molecules become essentially parallel to the surface of the substrate. Hence, light passes through a plane of polarization of the liquid-crystal layer without involvement of substantial alteration. Consequently, in an inoperative state, essentially-perfect black can be displayed by means of placing polarizing plates on upper and lower surfaces of the respective substrates.

In the IPS mode, essentially-perfect black can be displayed in the direction of the normal to a display surface. However, when the display surface is observed from a direction deviating from the direction of the normal, leakage of light, which cannot be avoided for reasons of the characteristic of the polarizing plate, arises in directions deviating from the direction of the optical axis of each of the polarizing plates between which the liquid-crystal cell is sandwiched. Consequently, there arises a problem of the angle of view (hereinafter called a "view angle") becoming narrow.

An optical film solving this problem is described in JP-A-2005-99476. However, this optical film can suppress leakage of light attributable to the view angle, but encounters difficulty in suppressing occurrence of changes in tint ascribable to the view field.

SUMMARY OF THE INVENTION

The present invention has been conceived in view of the circumstances, and aims at providing an optical film capable of minimizing leakage of light attributable to a view angle and changes in tint, which arise in an image display device.

(1) An optical film comprising: a polarizer having an absorption axis; and at least three retardation films, each having a slow axis, wherein the absorption axis of the polarizer intersects the slow axis of each of the at least three retardation films at right angles and is parallel to the slow axis of each of the at least three retardation films, the slow axis of each of the at least three retardation films are parallel to each other, a total amount of Nz value of each of the at least three retardation films, the Nz value being defined by formula (I), is half as many as the number of the at least three retardation films, and an in-plane retardation $Re_1$ of each of the at least three retardation films, the in-plane retardation $Re_1$ being defined by formula (II), ranges from 200 to 350 nm:

$$Nz=(nx_1-nz_1)/(nx_1-ny_1) \quad (I)$$

$$Re_1=(nx_1-ny_1)\times d_1 \quad (II)$$

wherein, on condition that a direction in which the in-plane refractive index of each of the at least three retardation films is maximized is taken as an X axis; a direction perpendicular to the X axis is taken as a Y axis; and a thickness-direction of the retardation film is taken as a Z axis, $nx_1$, $ny_1$ and $nz_1$ are refractive index achieved along the X axis, the Y axis and the Z axis, respectively, and $d_1$ is a thickness of each of the at least three retardation films.

(2) The optical film as described in the item (1), wherein the at least three retardation films comprise the three retardation films, the absorption axis of the polarizer is parallel to the slow axis of each of the three retardation films, and the Nz value of each of the three retardation films ranges from 0.85 to 0.9, 0.4 to 0.6, and 0.1 to 0.15 in order from the polarizer.

(3) The optical film as described in the item (1), wherein the at least three retardation films comprise the three retardation films, the absorption axis of the polarizer intersects the slow axis of each of the three retardation films at right angles, and the Nz value of each of the three retardation films ranges from 0.1 to 0.15, 0.4 to 0.6, and 0.85 to 0.9 in order from the polarizer.

(4) The optical film as described in the item (1), which comprises: protective films that are transparent and oppose each other with the polarizer interposed therebetween; and each of the three retardation films are laminated on one of the protective films.

(5) The optical film as described in the item (4), wherein an in-plane retardation $Re_2$ of at least one of the protective films, the in-plane retardation $Re_2$ being defined by formula (III), is 20 nm or less, and a thickness-direction retardation $R_{th}$ of the protective films, the thickness-direction retardation $R_{th}$ being defined by formula (III), is 30 nm or less:

$$Re_2=(nx_2-ny_2)\times d_2 \quad (III)$$

$$R_{th}=\{(nx_2+ny_2)/2-nz_2\}\times d_2 \quad (IV)$$

wherein on condition that a direction in which an in-plane refractive index of each of the protective films is maximized is taken as an X axis; a direction perpendicular to the X axis is taken as a Y axis; and a thickness-direction of the protective film is taken as a Z axis, $nx_2$, $ny_2$ and $nz_2$ are refractive index achieved along the X axis, the Y axis and the Z axis, respectively, and $d_2$ is a thickness of each of the at least three retardation films.

(6) The optical film as described in the item (4) or (5), wherein each of the protective films are subjected to stretching treatment.

(7) An image display device comprising: an optical film as described in any one of the items (1) to (6); and display unit that displays an image.

(8) A liquid-crystal display device of IPS mode, which comprises: a liquid-crystal panel including a liquid-crystal substance; an optical film as described in any one of the items (1) to (6), the optical film being provided on a display screen side of the liquid-crystal panel; and a polarizer provided on a side of the liquid-crystal panel opposite the display screen, wherein in a state that no voltage is applied to the liquid-crystal panel, a direction of an anomalous refractive index of a liquid-crystal substance and the absorption axis of the polarizer are parallel to each other.

(9) A liquid-crystal display device of IPS mode, which comprises; a liquid-crystal panel including a liquid-crystal substance; an optical film as described in any one of the items (1) to (6), the optical film being provided on a side of the liquid-crystal panel opposite the display screen; and a polarizer provided on the display screen side of the liquid-crystal panel, wherein in a state that no voltage is applied to the liquid-crystal panel, a direction of an anomalous refractive index of a liquid-crystal substance and the absorption axis of the polarizer intersect at right angles.

According to the present invention, there can be provided an optical film capable of minimizing leakage of light attributable to a view angle and changes in tint, which arise in an image display device.

BRIEF DESCRIPTION OF THE DRAWINGS

The invention disclosed herein will be understood better with reference to the following drawings of which.

DETAILED DESCRIPTION OF THE INVENTION

Exemplary embodiments of the present invention will be described herein below by reference to the drawings. Throughout the specification, the expression "numeral a to numeral b" signifies a numeral "a" to a numeral "b."

Figure 1A:
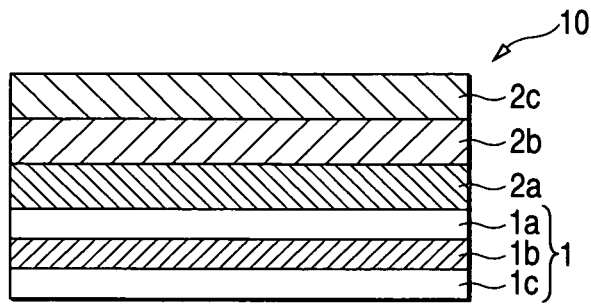
FIGS. 1A to 1C are views that illustrate an example configuration of an optical film showing an embodiment of the present invention.
Figure 1B:
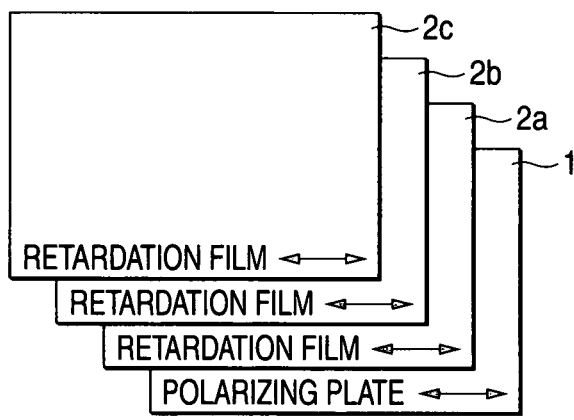
Figure 1C:
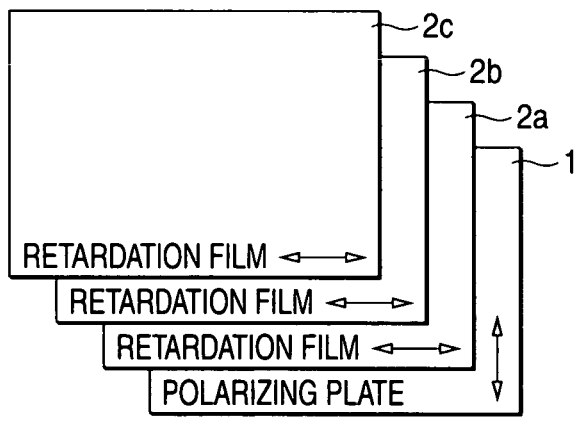
Figure 2A:
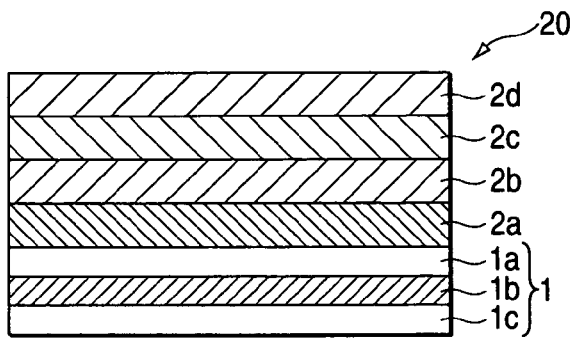
FIGS. 2A to 2C are views that illustrate the example configuration of an optical film showing an embodiment of the present invention.
Figure 2B:
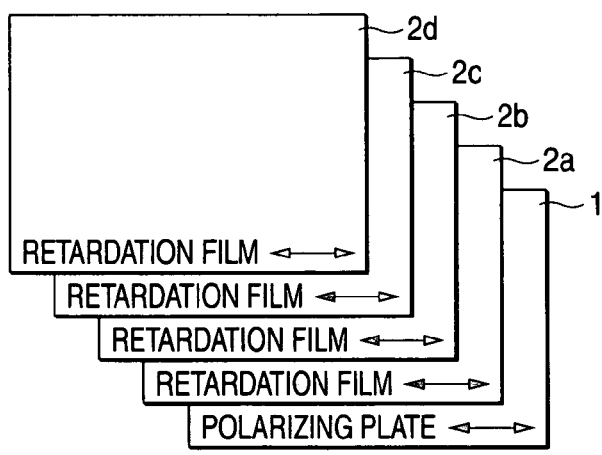
Figure 2C:
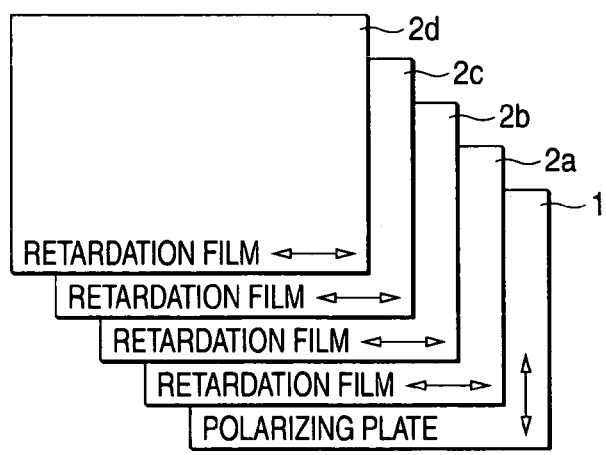

FIGS. 1 and 2 are views showing an example configuration of an optical film showing an embodiment of the present invention. FIG. 1A is a cross-sectional view, and FIGS. 1B, 1C are views showing a relationship between optical axes of respective constituent elements, In FIGS. 1, 2A, and 2B, arrows are illustrated in the respective constituent elements. In FIGS. 1, 2B, and 2C, the arrows depict the optical axis (a slow axis in the case of a retardation film, and an absorption axis of a polarizer constituting a polarizing plate in the case of the polarizing plate).

The optical film 10 shown in FIG. 1 comprises a polarizing plate 1 including a polarizer 1b sandwiched between two transparent protective films 1a, 1c; a retardation film 2a laminated on the protective film 1a of the polarizer 1; a retardation film 2b laminated on the retardation film 2a; and a retardation film 2c laminated on the retardation film 2b.

As shown in FIG. 1B, the optical film 10 has a structure where the polarizing plate 1 and the retardation films 2a, 2b, and 2c are laminated one on top of the other such that an absorption axis of the polarizing plate 1 and slow axes of the retardation films 2a, 2b, and 2c become parallel to each other and such that slow axes of the respective retardation films 2a, 2b, and 2c become parallel to each other. As show in FIG. 1C, the optical film 10 may also assume a structure where the polarizing plate 1 and the retardation films 2a, 2b, and 2c are laminated one on top of the other in such a way that the absorption axis of the polarizing plate 1 and the respective slow axes of the retardation films 2a, 2b, and 2c intersect at right angles and in such a way that the respective slow axes of the retardation films 2a, 2b, and 2c become parallel to each other.

An optical film 20 shown in FIG. 2 differs from the optical film 10 shown in FIG. 1 in that another retardation film 2d is additionally laminated on the retardation film 2c. As shown in FIG. 2B, a slow axis of the retardation film 2d is parallel to the slow axes of the other retardation films and the absorption axis of the polarizing plate 1. As shown in FIG. 2C, the optical film 20 may also assume a structure where the polarizing plate 1 and the retardation films 2a, 2b, 2c, and 2d are laminated one on top of the other in such a way that the absorption axis of the polarizing plate 1 and the slow axes of the respective retardation films 2a, 2b, 2c, and 2d intersect at right angles and in such a way that the slow axes of the retardation films 2a, 2b, 2c, and 2d become parallel to each other, as in the case of the optical film 10.

In FIGS. 1 and 2, three or four retardation films are laminated on the protective film 1a of the polarizing plate 1. However, the protective film 1a may be omitted, and three or four retardation films maybe caused to act as protective films. Alternatively, five or more retardation films may be laminated.

The inventive efforts made by the present inventors have yielded the following. An optical film includes: a polarizer having an absorption axis; and at least three retardation films, each having a slow axis, wherein the absorption axis of the polarizer intersects the slow axis of each of the at least three retardation films at right angles and is parallel to the slow axis of each of the at least three retardation films, the slow axis of each of the at least three retardation films are parallel to each other, a total amount of Nz value of each of the at least three retardation films, the Nz value being defined by formula (I), is substantially half as many as the number of the at least three retardation films, and an in-plane retardation $Re_1$ of each of the at least three retardation films, the in-plane retardation $Re_1$ being defined by formula (II) ranges from 200 to 350 nm:

$$Nz=(nx_1-nz_1)/(nx_1-ny_1) \qquad (I)$$

$$Re_1=(nx_1-ny_1) \times d_1 \qquad (II)$$

wherein, on condition that a direction in which the in-plane refractive index of each of the at least three retardation films is maximized is taken as an X axis; a direction perpendicular to the X axis is taken as a Y axis; and a thickness-direction of the retardation film is taken as a Z axis, $nx_1$, $ny_1$ and $nz_1$ are refractive index achieved along the X axis, the Y axis and the Z axis, respectively, and $d_1$ is a thickness of each of the at least three retardation films.

When this optical film is applied to an image display device such as a liquid-crystal display panel, especially, a liquid-crystal display device of IPS node, leakage of light attributable to the view field of the image display device and changes in tint can be reduced.

Further, it is also found that, in an optical film shown in FIG. 1B, an effect of reducing changes in tint is enhanced when the Nz value of the retardation film 2a ranges from 0.85 to 0.9; the Nz value of the retardation film 2b ranges from 0.4 to 0.6; and the Nz value of the retardation film 2c ranges from 0.1 to 0.15.

It is also found that, in an optical film shown in FIG. 1C, an effect of reducing changes in tint is enhanced when the Nz value of the retardation film 2a ranges from 0.1 to 0.15; the Nz value of the retardation film 2b ranges from 0.4 to 0.6; and the Nz value of the retardation film 2c ranges from 0.85 to 0.9.

A result of simulation intended for verifying the above effects will be described below, Before that, constituent elements of the optical film and the manner of forming the optical film are described.

Films satisfying the above Nz values and the value of in-plane retardation Re, can be used as the retardation film without any limitation. For instance, a birefringent polymer film, a liquid-crystal polymer-aligned film, and the like, are mentioned.

For instance, polymers include polycarbonate; polyolefine such as polypropylene; polyester such as polyethylene terephthalate, polyethylene naphthalate, and the like; acrylic polyolefine such as polynorbornene; polyvinyl alcohol; polyvinylbutyral; polymethylvinylether; polyhydroxyethylacrylate; hydroxyethylcellulose: hydroxypropylcellulose; methylcellulose; polyallylate; polysulfone; polyethersulfone; polyphenylene sulfide; polyphenylene oxide; polyalsulfone; polyvinyl alcohol; polyamide; polyimide; polyvinyl chloride; cellulose polymer; binarypolymers thereof; ternarypolymers thereof; graft copolymers thereof; blends thereof; and the like. A retardation film having an arbitrary $Re_1$ and an arbitrary Nz value is obtained by means of controlling a thicknesswise refractive index of a polymer film under a method for biaxially stretching a polymer film in the direction of a plane, a method for uniaxially or biaxially stretching the polymer film in the direction of a plane as well as in a thicknesswise direction. Alternatively, the retardation film is obtained by means of a method for bonding a heat-shrinkable film to a polymer film and heating the thus-bonded films to thus subject the polymer film to stretching and/or shrinking treatment under the influence of shrinkage force of the heat-shrinkable film, thereby tilt-aligning the film, or a like method.

Liquid-crystal polymer includes, for example, various types of liquid crystal polymers, such as liquid-crystal polymer of principal-chain type or side-chain type, wherein a conjugate linear atomic group (mesogen) imparting a liquid crystal orientation is introduced into a principal chain or a side chain of a polymer. A specific example of liquid-crystal polymer of principal-chain type includes liquid-crystal polymer having a mesogen group coupled to a spacer section which imparts flexibility; e.g., nematic-aligned polyester liquid-crystal polymer, discotic polymer, cholesteric polymer, and the like. Specific examples of liquid-crystal polymer of side-chain type include liquid-crystal polymer having polysiloxane, polyacrylate, polymethacrylate, or polymalonate as the principal-chain framework structure; and having a mesogen section—which is formed from a para-substituted cyclic compound unit having a property of imparting nematic alignment—as a side chain, by way of a spacer section formed from a conjugate atomic group. Films preferred as these orientated films of liquid-crystal polymer include an orientated film formed by means of rubbing the surface of a thin film, such as polyimide, polyvinyl alcohol, or the like, formed on a glass plate; and an orientated film where liquid-crystal polymer is aligned by means of spreading an aqueous solution of liquid-crystal polymer over a surface having undergone orientation, such as a surface on which silicon dioxide is vapor-deposited, and subjecting the thus-spread solution to heat treatment, thereby aligning, particularly preferably tilt-aligning, liquid crystal polymer.

No limitation is imposed on the polarizer, and various types of polarizers can be used. For instance, the polarizer includes a polarizer formed by causing a hydrophilic polymer film, such as a polyvinyl-alcohol-based film, a partial-formal polyvinyl-alcohol-based film, an ethylene-vinyl-acetate-copolymer-based partially-safonicated film, or the like, to adsorb a dichroic substance, such as iodine, a dichroic dye, or the like, and subjecting the film to uniaxial stretching treatment; a polyene-based orientated film, such as a film formed by subjecting polyvinyl alcohol to dehydrating treatment or a film formed by subjecting polyvinyl chloride to dehydrochlorinating treatment; and the like. Of these polarizers, a polarizer formed from a polyvinyl-alcohol-based film and a dichroic substance, such as iodine, is preferable. No specific limitations are imposed on the thickness of each of the polarizers. Generally, the thickness of the polarizer ranges from 5 to 80 μm or thereabouts.

The polarizer, which is formed by dyeing a polyvinyl-alcohol-based film with iodine and uniaxially stretching the thus-dyed film, can be manufactured by immersing a polyvinyl-alcohol-based film into an aqueous solution of iodine and stretching the thus-dyed film by a factor of 3 to 7. The polyvinyl-alcohol-based film can also be immersed in an aqueous solution of potassium iodide, which may contain a boric acid, zinc sulfate, zinc chloride, or the like, as required. Further, when necessary, the polyvinyl-alcohol-based film may also be immersed in water for cleansing before being dyed. The polyvinyl-alcohol-based film is washed, to thus cleanse stains or a blocking inhibitor on the surface of the polyvinyl-alcohol-based film, Further, the polyvinyl-alcohol-based film is also swelled, thereby yielding an effect of preventing occurrence of inconsistencies in dye. The polyvinyl-alcohol-based film may be stretched after having been dyed with iodine; stretched while being dyed; or dyed with iodine after having been stretched. The polyvinyl-alcohol-based film can also be stretched in an aqueous solution of a boric acid or potassium iodide or while being bathed.

In relation to the polarizer, on condition that a direction in which an in-plane refractive index of each of two protective films is maximized is taken as an X axis; a direction perpendicular to the X axis is taken as a Y axis; and a thicknesswise direction of the protective film is taken as a Z axis; and that a refractive index achieved along the X axis is taken as $nx_2$; a refractive index achieved along the Y axis is taken as $ny_2$; a refractive index achieved along the Z axis is taken as $nz_2$; and the thickness of each of the protective films is taken as $d_2$(nm), in-plane retardation of at least one of the two protective films; i.e., $Re_2=(nx_2-ny_2)\times d_2$, is preferably 20 nm or less, and thicknesswise retardation of the protective film, i.e., $R_{th}=\{(nx_2+ny_2)/2-nz_2\}\times d_2$ is preferably 30 nm or less.

Moreover, the in-plane retardation $Re_2$ of at least one of the protective films is 10 nm or less, and the thicknesswise retardation $R_{th}$ is preferably 20 nm or less. As mentioned above, the residual retardation of the protective film protecting the polarizer is made smaller, whereby the design of the retardation film laminated on the polarizer is facilitated, and an optical film exhibiting a high protection effect ascribable to the retardation film can be obtained. Although specific limitations are not imposed on the thickness $d_2$ of the protective film, the thickness is generally 500 μm or less; preferably ranges from 1 to 300 μm; and specially ranges from 5 to 200 μm.

A specific limitation is not imposed on a material used for forming the two protective films that protect the polarizer. However, (A) a material containing thermoplastic resin having at the side chain thereof a substituted and/or unsubstituted imide group and (B) a material containing a thermoplastic resin having at the side chain thereof a substituted and/or unsubstituted phenyl group and a nitrile group can be preferably used. A protective film containing either the thermoplastic resin (A) or (B) is less likely to cause retardation even when exposed to stress due to a change in the dimension of the polarizer. Even when the film have been subjected to stretching treatment, the in-plane retardation $Re_2$ and thicknesswise retardation $R_{th}$ can be controlled so as to become smaller. The protective films containing the thermoplastic resins (A) and (B) are described in, e.g., WO 01/37007. The protective film can contain another resin rather than when the film contain the thermoplastic resins (A), (B) as the principal constituents.

The thermoplastic resin (A) has at the side chain thereof the substituted and/or unsubstituted imide group; and has at its main chain thereof arbitrary thermoplastic resin. The main chain may be formed solely from, e.g., carbon atoms; or atoms other than carbon may be inserted between the carbon atoms. Alternatively, the main chain may be formed from atoms other than carbon atoms. The main chain is preferably hydrocarbon or substituted products thereof. The main chain is made by, e.g., addition polymerization: and is specifically, e.g., polyolefine or polyvinyl. The main chain is also obtained through condensation polymerization; and is e.g., an ester bond or an amide bond. The main chain is preferably a polyvinyl framework obtained by means of polymerization of a substituted vinyl monomer.

A related-art arbitrary method can be adopted as a method for introducing a substituted and/or unsubstituted imide group to the thermoplastic resin (A). The method includes, e.g., a method for polymerizing a monomer having the imide group, a method for polymerizing various monomers to thus form a main chain and subsequently introducing the imide group to the main chain, a method for grafting a compound having the imide group to the side chain, and the like. A conventionally-known substituent, which enables substitution of hydrogen in the imide group, can be used as the substituent of the imide group. For instance, an alkyl group can be mentioned.

The thermoplastic resin (A) is preferably a multi-component copolymer of binary components or more having a recurring unit derived from at least one type of olefin and another recurring unit having at least one type of substituted and/or unsubstituted maleimide structure. The olefin-maleimide copolymer can be synthesized from an olefin-maleimide compound by means of a known method. The synthesizing method is described in, e.g., JP-A-5-59193, JP-A-5-195801, JP-A-6-136058, and JP-A-9-328523.

For instance, olefin includes isobutene, 2-methyl-1-butene, 2-methyl-1-pentene, 2-methyl-1-hexane, 2-methyl-1-heptene, 1-isooctene, 2-methyl-1-octene, 2-ethyl-1-pentene, 2-ethyl-2-butene, 2-methyl-2-pentene, 2-methyl-2-hexene, and the like. Among these olefins, isobutene is preferable. These olefins may be used alone, or two types or more of them may be used in combination.

The maleimide compounds include maleimide, N-methylmaleimide, N-ethylmaleimide, N-n-propylmaleimide, N-i-propylmaleimide, N-n-butylmaleimide, N-s-butylmaleimide, N-t-butylmaleimide, N-n-pentylmaleimide, N-n-hexylmaleimide, N-n-heptylmaleimide, N-n-octylmaleimide, N-larurylmaleimide, N-stearylmaleimide, N-cyclopropylmaleimide, N-cyclobutylmaleimide, N-cyclopentylmaleimide, N-cyclohexylmaleimide, N-cycloheptylmaleimide, N-cyclooctylmaleimide, and the like. Among these maleimide compounds, N-methylmaleimide is preferable. These maleimide compounds may be used solely, or two types or more of maleimide compounds may be used in combination.

No limitations are imposed on the amount of recurring unit of olefin contained in the olefin-maleimide copolymer. The total amount of recurring unit of thermoplastic resin (A) ranges from 20 to 70 mol % or thereabouts, preferably 40 to 60 mol %, and more preferably 45 to 55 mol %. The amount of contained recurring unit of maleimide structure ranges from 30 to 80 mol % or thereabouts, preferably 40 to 60 mol %, and more preferably 45 to 55 mol %.

The thermoplastic resin (A) contains the recurring unit of olefin and the recurring unit of the maleimide structure; and can be formed solely from these units. In addition to containing these units, the thermoplastic resin may contain a recurring unit of another vinyl-based monomer in proportion of 50 mol % or less. The other vinyl-based monomer includes an acrylic monomer such as methyl acrylate, butyl acrylate, and the like; a methacrylic monomer such as methyl methacrylate, cyclohexyl methacrylate, and the like; a vinylester monomer such as vinyl acetate, and the like; a vinylether monomer such as methylvinylehter; an acid anhydride such as maleic anhydride; a styrene-based monomer such as styrene, α-methylstyrene, p-methoxystyrene, and the like; and so on.

Specific limitations are not imposed on the weight-average molecular weight of thermoplastic resin (A), but the weight-average molecular weight of thermoplastic resin (A) ranges from $1\times10^3$ to $5\times10^6$ or thereabouts. The weight-average molecular weight preferably ranges from $1\times10^4$ to $5\times10^5$. A glass-transition temperature of thermoplastic resin (A) preferably ranges from 80° C. to 100° C., and more preferably 130° C. or more.

Glutarimide-based thermoplastic resin can be used for the thermoplastic resin (A). The glutarimide-based thermoplastic resin is described in JP-A-2-153904 or the like. The glutarimide-based thermoplastic resin has a glutamic imide structure unit and a methyl acrylate or methyl methacrylate structure unit. The other vinyl-based monomer can be introduced into glutamic imide resin.

The thermoplastic resin (B) has at the side chain thereof a substituted and/or unsubstituted phenyl group and a nitrile group. The main chain, which is the same as that of the thermoplastic resin (A), can be illustrated as the main chain of the thermoplastic resin (B).

The method for introducing the phenyl group into the thermoplastic resin (B) includes; e.g., a method for polymerizing a monomer having the phenyl group; a method for polymerizing various monomers to thus form a main chain and subsequently introducing a phenyl group; a method for grafting a compound having a phenyl group to the side chain, and the like. A conventionally-known substituent, which enables substitution of hydrogen in the phenyl group, can be used as the substituent of the phenyl group. For instance, an alkyl group can be mentioned. The method that is the same as that used for introducing the phenyl group can be adopted as the method for introducing a nitrile group into the thermoplastic resin (B).

The thermoplastic resin (B) is preferably a multi-component copolymer of binary, ternary components or more having a recurring unit (a nitrile unit) derived from unsaturated nitrile compound and another recurring unit (a styrene-based unit) derived from a styrene-based compound. For instance, an acrylonitrile-styrene-based copolymer can be preferably used.

The unsaturated nitrile compound includes an arbitrary compound having a cyano group or a reactive double bond. For instance, the unsaturated nitrile compound includes α-substituted unsaturated nitrile such as acrylonitrile, methacrylonitrile, or the like; a nitrile compound having α,β-disubstituted olefiny unsaturated bond such as fumaronitrile or the like; and so on.

The styrene-based compound includes an arbitrary compound having a phenyl group and a reactive double bond. For instance, the styrene-based compound includes unsubstituted or substituted styrene-based compounds such as styrene, vinyltoluene, methoxystyrene, chlorostyrene, and the like; α-substituted-styrene-based compound such as α-methylstyrene, and the like; and so on.

The amount of nitrile unit contained in the thermoplastic resin (B) is not particularly limited. However, with reference to the total recurring units, the amount of nitrile unit ranges from 10 to 70 wt % or thereabouts, preferably 20 to 60 wt %, and more preferably 20 to 50 wt %. Particularly, the range of 20 to 40 wt % and the range of 20 to 30 wt % are preferable. The styrene-based unit ranges from 30 to 80 wt % or thereabouts; preferably 40 to 80 wt %; more preferably 50 to 80 wt %; and especially preferably 60 to 80 wt % and 70 to 80%.

The thermoplastic resin (B) contains the nitrile unit and the styrene-based unit, and can be formed solely from these units. In addition to containing the above units, the thermoplastic resin (B) may contain a recurring unit of another vinyl-based monomer in proportion of 50 mol % or less. The other vinyl-based monomer includes the monomers illustrated in connection with the thermoplastic resin (A), a recurring unit of olefin, a recurring unit of maleimide, a recurring unit of substituted maleimide, and the like. The thermoplastic resin (B) includes AS resin, ABS resin, ASA resin, and the like.

The weight-average molecular weight of thermoplastic resin (B) is not particularly limited, but ranges from $1 \times 10^3$ to $5 \times 10^6$ or thereabouts. The weight-average molecular weight preferably ranges from $1 \times 10^4$ to $5 \times 10^5$.

The proportion between thermoplastic resin (A) and thermoplastic resin (B) is adjusted in accordance with retardation required of the transparent protective film. In general, in relation to a compounding ratio, the content of thermoplastic resin (A) preferably accounts for 50 to 95 wt % of the total amount of resin in the film; preferably 60 to 95 wt % of the same; and more preferably 65 to 90 wt % of the same. The content of thermoplastic resin (B) preferably accounts for 5 to 50 wt % of the total amount of resin in the film; preferably 5 to 40 wt % of the same; and more preferably 10 to 35 wt % of the same. The thermoplastic resin (A) and the thermoplastic resin (B) are thermally melt and kneaded to thus be mixed together.

A protective film preferably used as the protective film for protecting a polarizer includes the illustrated thermoplastic resin (A) having at the side chain thereof a substituted and/or unsubstituted imide group and the thermoplastic resin (B) having at the side chain thereof a substituted and/or unsubstituted phenyl group and the nitrile group. The protective film using these materials can be used while being laminated on either side of the polarizer. In addition, a protective film containing the material is used for one side of the polarizer, and a protective film containing a material other than the above materials can be used for the other side of the polarizer. Moreover, a protective film containing a material other than those mentioned above can be used for both sides of the polarizer. The optical film of the present embodiment preferably has a structure where a retardation film is laminated on the protective film containing the illustrated thermoplastic resin (A) having at the side chain thereof a substituted and/or unsubstituted imide group and the thermoplastic resin (B) having at the side chain thereof a substituted and/or unsubstituted phenyl group and the nitrile group. By means of this structure, in-plane inconsistencies in black display can be lessened.

A preferred material other than those mentioned previously, which is used for forming the protective film, is superior in terms of transparency, mechanical strength, thermal stability, a moisture shielding characteristic, isotropy, and the like. For instance, the material includes a polyester-based polymer such as polyethylene terephthalate, polyethylene naphthalene, and the like; a cellulose-based polymer such as diacetylcellulose, triacetylcellulose, and the like; an acrylic polymer such as polymethylmethacrylate, and the like; a styrene-based polymer such as polystyrene, acrylonitrile-styrene copolymer (AS resin) or the like; a polycarbonate-based polymer; and so on. Further, a polyolefine-based polymer such as polyethylene, polypropylene, cyclo-based polyolefine or polyolefine having a norbornene structure, an ethylene-propylene copolymer, and the like; a vinylchloride-based polymer; an amide-based polymer such as nylon, aromatic polyamide, and the like; an imide-based polymer, a sulfonic polymer, polyethersulfone-based polymer, a polyetherketone-based polymer, a polyphenylene-sulfide-based polymer, a vinyl-alcohol-based polymer, a vinylidene-chloride-based polymer, a vinyl-butyral-based polymer, an allylate-based polymer, a polyoxymethylene-based polymer, an epoxy-based polymer, or blends thereof can be mentioned as example polymers used for forming the transparent protective film. The transparent protective film can also be formed as a cured layer of thermosetting-type UV-hardening-type resin, such as acrylic resin, urethane resin, acrylic urethane resin, epoxy resin, silicon resin, and the like.

The surface of the protective film, to which a polarizer is not bonded, may also be subjected to treatment intended for forming a hardcoating layer, antireflection treatment, and treatment intended for preventing sticking, diffusion, or antiglare.

The hardcoating treatment is performed with a view toward protecting the surface of the polarizer from flaws. The hardcoating layer can be formed by means of adding a hardening coat having superior hardness or a sliding characteristic; e.g., acrylic UV hardening resin or a silicon UV hardening resin, to the surface of the transparent protective film. The antireflection treatment is performed with a view toward preventing reflection of external light from the surface of the polarizer, and can be achieved by means of forming an antireflection film complying with a conventional antireflection film. The sticking prevention treatment is performed for the purpose of preventing adhesion between adjacent layers.

Antiglare treatment is performed for the sake of preventing occurrence of hindrance to visual ascertainment of the light having passed through the polarizer, which would otherwise be caused when external light is reflected by the surface of the polarizer. Antiglare treatment can be implemented by means of imparting minute irregular structures to the surface of the transparent protective film under an appropriate method such as a roughening method involving a sandblasting technique or an embossing technique, or a method for mixing transparent fine particles. Transparent fine particles, such as conductive/nonconductive inorganic fine particles which have an average particle size of 0.5 to 50 μm and which are made of silica, alumina, titania, zirconia, tin oxide, indium oxide, cadmium oxide, antimony oxide, and the like; organic fine particles formed from crosslinked and/or uncrosslinked polymers; and so on, are used as the fine particles contained during formation of the surface fine irregular structures. The amount of fine particles during formation of the surface fine irregular structures is generally 2 to 50 parts by weight with reference to 100 parts by weight of transparent resin used for forming the surface fine irregularity structures. A preferable amount of fine particles is 5 to 25 parts by weight. The antiglare layer may also double as a diffusion layer (a view angle spreading function or the like) for spreading a view angle by spreading the light having passed through the polarizer.

The antireflection layer, the anti-sticking layer, the diffusion layer, an antiglare layer, and the like, can be provided on a transparent protective film. Moreover, these layer can be provided as other optical layers separate from the transparent protective film.

An isocyanate-based adhesive, a polyvinyl-alcohol-based adhesive, a gelatin-based adhesive, a vinyl-based latex, aqueous polyester, and the like, can be used in the treatment for bonding the polarizer to the protective film.

No specific limitation is imposed on the method for laminating the retardation film to the polarizer, and lamination can be carried out by means of an adhesive layer or the like. No specific limitations are imposed on the adhesive used for forming an adhesive layer. For instance, adhesives using, as a base polymer, an acrylic polymer, a silicon polymer, polyester, polyurethane, polyamide, polyether, fluorine-based polymer, rubber-based polymer, and the like, can be selectively used as required. Particularly, an adhesive exhibiting superior optical transparency and appropriate bonding characteristics—such as wettability, appropriate cohesive property, and stickness—superior weather-resistance, heat resistance; e.g., an acrylic adhesive, can be preferably used.

The optical film or the respective layers of the adhesive layer may be imparted with a UV absorbing capability by means of treating the film or layer with a UV absorbing agent; e.g., a salicylic-ester-based compound, a benzophenol-based compound, a benzotriazol-based compound, a cyanoacrylate-based compound, a nickel-complex-salt-based compound, and the like.

The optical film of the present invention is preferably used for an image display device having means for displaying an image, and particularly to a liquid-crystal display device of IPS mode, The liquid-crystal display device of IPS mode comprises a pair of glass substrates, a group of electrodes formed on one of the pair of glass substrates; a liquid-crystal composition layer which is sandwiched between the glass substrates and dielectric anisotropy; an orientation control layer which is formed on opposing surfaces of the pair of glass substrates and are used for orienting a molecular orientation of the liquid-crystal composition in a predetermined direction; and drive means for applying a drive voltage to the group of electrodes. The group of electrodes has a layout structure, wherein the electrodes are principally arranged so as to apply an essentially-parallel electric field to the orientation control layer and the liquid-crystal composition layer.

Figure 3A:
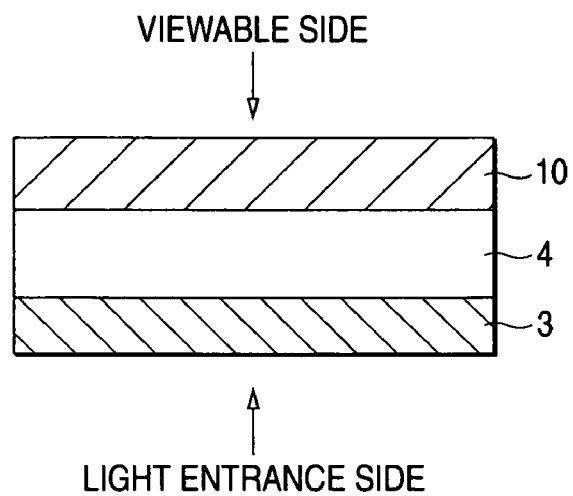
FIGS. 3A to 3B are views that illustrate an example configuration achieved when the optical film shown in FIG. 1B is applied to a liquid-crystal display device of IPS mode.
Figure 3B:
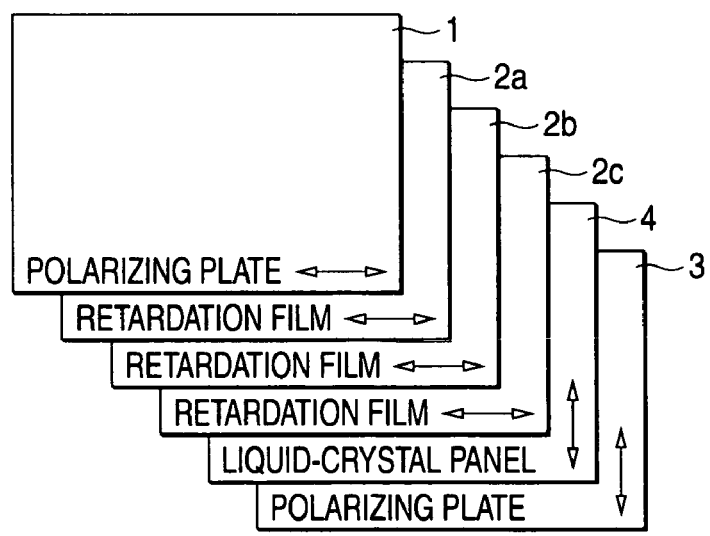
Figure 4A:
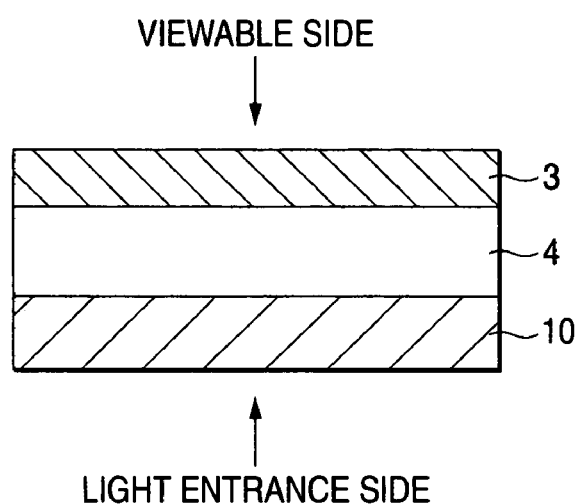
FIGS. 4A and 4B are views that illustrate an example configuration achieved when the optical film illustrated in FIG. 1B is applied to the liquid-crystal display device of IPS mode.
Figure 4B:
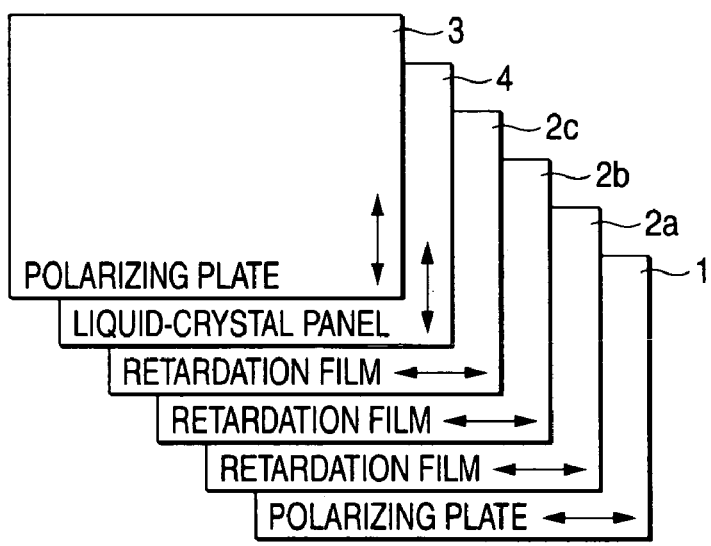

FIGS. 3 and 4 are views showing an example configuration acquired when the optical film shown in FIG. 1 is applied to the liquid-crystal display device of IPS mode. FIG. 3A is a cross-sectional view, and FIG. 3B is a view showing a relationship between optical axes of respective constituent elements of the liquid-crystal display device. In FIGS. 3 and 4B, arrows are provided to the respective constituent elements. The arrows depict the respective optical axes (the slow axis in the case of the retardation film, the absorption axis of the polarizer constituting a polarizing plate in the case of the polarizing plate, and the direction of anomalous refractive index of a liquid-crystal substance included in a liquid-crystal panel in the case of the liquid-crystal panel).

When the optical film 10 shown in FIG. 1B is used, the optical film 10 is placed on the image display side (a viewable side) of the liquid-crystal panel 4 such that the polarizing plate 1 comes top, as shown in FIG. 1B. The polarizing plate 3 having the same structure as that of the polarizing plate 1 is placed on a side (a light entrance side) of the liquid-crystal panel 4 opposite the image display screen side. As shown in FIG. 3B, the polarizing plate 3, the liquid-crystal panel 4, and the optical film 10 are laminated such that, in a state where the absorption axis of the polarizing plate 1 and that of the polarizing plate 3 intersect at right angles and where no voltage is applied to the liquid-crystal panel 4, the direction of anomalous refractive index of the liquid-crystal substance in the liquid-crystal panel 4 and the absorption axis of the polarizing plate 3 become parallel to each other.

As shown in FIG. 4, the optical film 10 is placed on the side (the light entrance side) of the liquid-crystal panel 4 opposite the image display screen thereof such that the polarizing plate 1 comes bottom. The polarizing plate 3 is placed on the image display screen side (the viewable side) of the liquid-crystal panel 4. As shown in FIG. 4B, the polarizing plate 3, the liquid-crystal panel 4, and the optical film 10 are laminated such that, in a state where the absorption axis of the polarizing plate 1 and that of the polarizing plate 3 intersect at right angles and where no voltage is applied to the liquid-crystal panel 4, the direction of anomalous refractive index of the liquid-crystal substance in the liquid-crystal panel 4 and the absorption axis of the polarizing plate 1 become parallel to each other.

When the optical film 10 shown in FIG. 2B is used, the retardation film 2d is interposed between the liquid-crystal panel 4 and the retardation film 2.

Figure 5A:
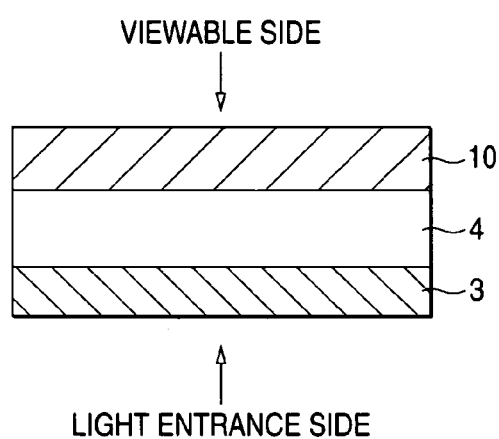
FIGS. 5A and 5B are views that illustrate an example configuration achieved when the optical film illustrated in FIG. 1C is applied to the liquid-crystal display device of IPS mode.
Figure 5B:
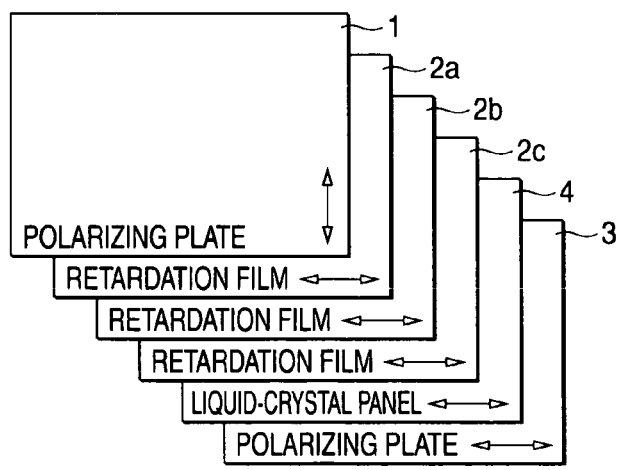

When the optical film 10 shown in FIG. 1C is used, the optical film 10 is placed on the image display side (the viewable side) of the liquid-crystal panel 4 such that the polarizing plate 1 comes top, as shown in FIG. 5. The polarizing plate 3 having the same structure as that of the polarizing plate 1 is placed on the side (the light entrance side) of the liquid-crystal panel 4 opposite the image display screen side. As shown in FIG. 5B, the polarizing plate 3, the liquid-crystal panel 4, and the optical film 10 are laminated such that, in a state where the absorption axis of the polarizing plate 1 and that of the polarizing plate 3 intersect at right angles and where no voltage is applied to the liquid-crystal panel 4, the direction of anomalous refractive index of the liquid-crystal substance in the liquid-crystal panel 4 and the absorption axis of the polarizing plate 1 intersect at right angles.

Figure 6A:
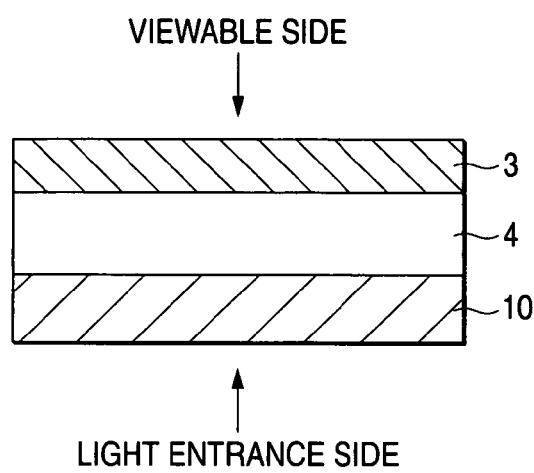
FIGS. 6A and 6B are views that illustrate an example configuration achieved when the optical film illustrated in FIG. 1C is applied to the liquid-crystal display device of IPS mode.
Figure 6B:
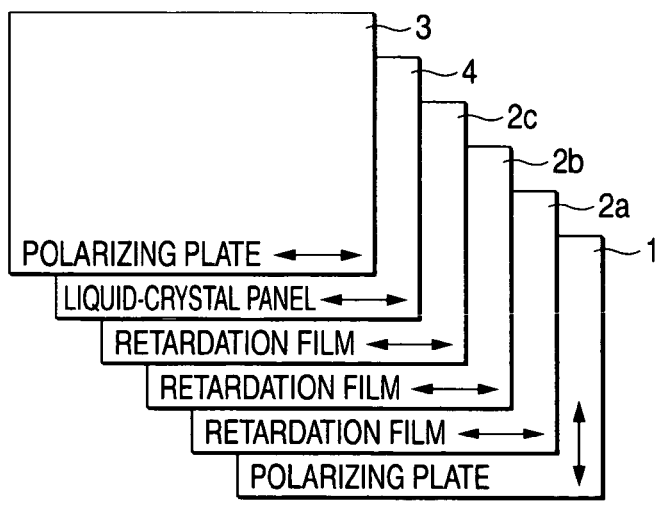

As shown in FIG. 6, the optical film 10 is placed on the side (the light entrance side) of the liquid-crystal panel 4 opposite the image display screen side thereof such that the polarizing plate 1 comes bottom, and the polarizing plate 3 is placed on the side (the viewable side) of the liquid-crystal panel 4. Further, as shown in FIG. 6B, the polarizing plate 3, the liquid-crystal panel 4, and the optical film 10 are laminated such that, in a state where the absorption axis of the polarizing plate 1 and that of the polarizing plate 3 intersect at right angles and where no voltage is applied to the liquid-crystal panel 4, the direction of anomalous refractive index of the liquid-crystal substance in the liquid-crystal panel 4 and the absorption axis of the polarizing plate 1 intersect at right angles.

In a case where the optical film 20 shown in FIG. 2C is used, there is achieved a structure where the retardation film 2d is sandwiched between the liquid-crystal panel 4 and the retardation film 2c.

The results of simulation of a view angle characteristic (brightness and tint), which were acquired when the configuration of the optical film in the previously-described liquid-crystal display device of. IPS mode had been changed as required, will now be described.

Simulation conditions were as follows:

$\Delta$nd ($\Delta$n: the magnitude of refractive index, d: the thickness of liquid crystal) of the liquid-crystal panel was set to 300 nm Simulation was conducted for two cases; namely, when a pre-tilt angle of the liquid-crystal composition included in the liquid-crystal panel was set to 0°, and when the pre-tilt angle was set to 1.5°. The orientation of the liquid-crystal composition is assumed to be rubbed in an antiprallel manner. Under these conditions, the liquid-crystal panel was brought into a black state, and dependence of transmissivity of light—having a wavelength of 380 to 780 nm—on a view angle was computed through optical simulation using a Jones matrix. Results were compared to each other. Brightness and chromaticity of the black display achieved at a polar angle of 60° and an azimuth angle of 0 to 360° were computed as data used for evaluating dependence on the view field. The computation results were graphed. In order to verify the effects of the present invention, a total of ten simulations; namely, comparative simulations 1 to 5, and simulations 1 to 5 of the present invention, were obtained.

Figure 7:
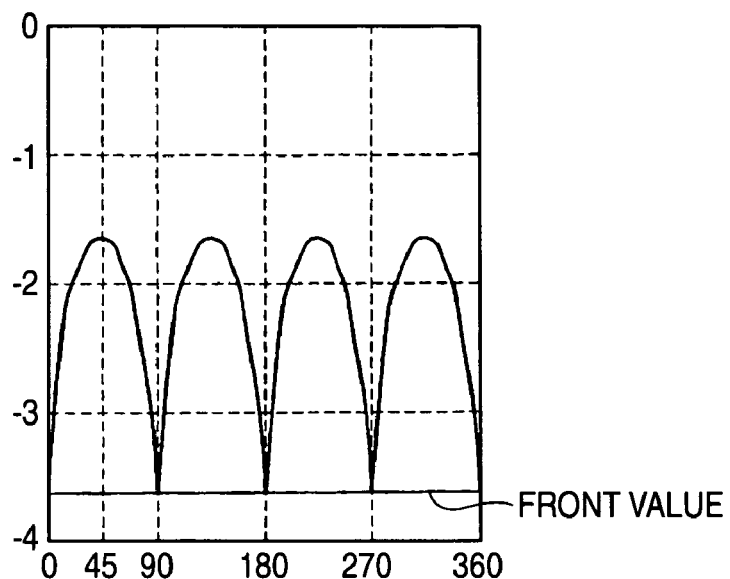
FIG. 7 is a view that illustrates a result of Comparative Simulation 1.
Figure 7:
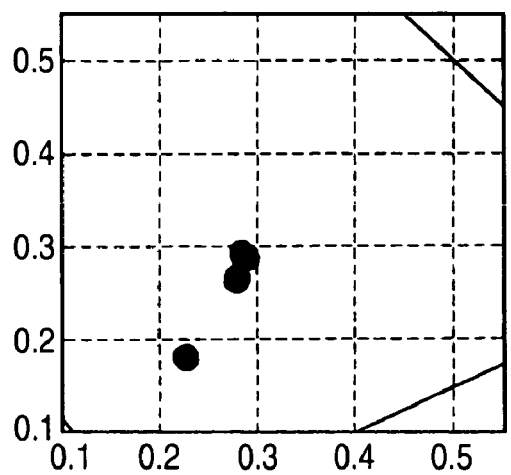

Comparative Simulation 1: In the liquid-crystal display device shown in FIG. 3B, the pre-tilt angle was set to 0°, and the retardation films 2a, 2b, and 2c were omitted. With this structure, the simulation was conducted. A result of the simulation is shown in FIG. 7.

Figure 8:
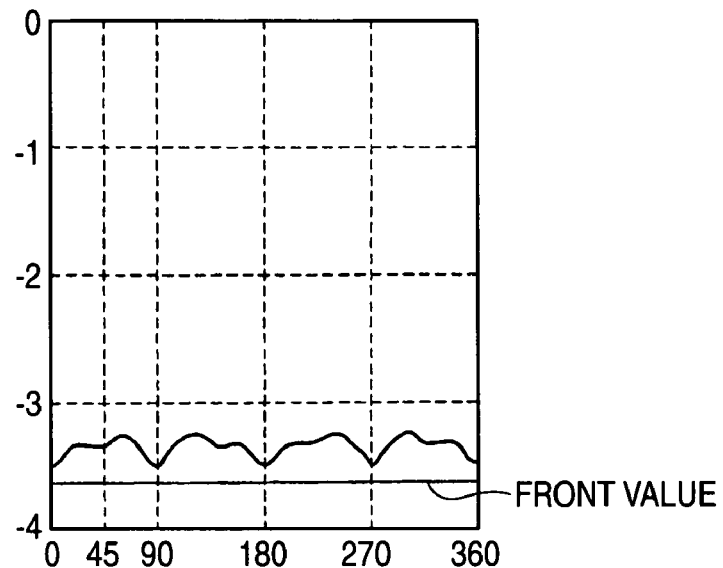
FIG. 8 is a view that illustrates a result of Comparative Simulation 2.
Figure 8:
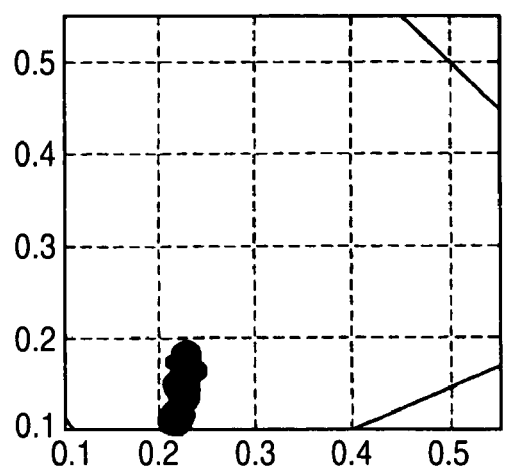

Comparative Simulation 2: In the liquid-crystal display device shown in FIG. 3B, the pre-tilt angle was set to 0°, and the retardation films 2b, 2c were omitted. Simulation was conducted on condition that the Nz value of the retardation film 2a is 0.5; $Re_1$ is 275 nm; and a total of Nz value is 0.5. A result of the simulation is shown in FIG. 8.

Figure 9:
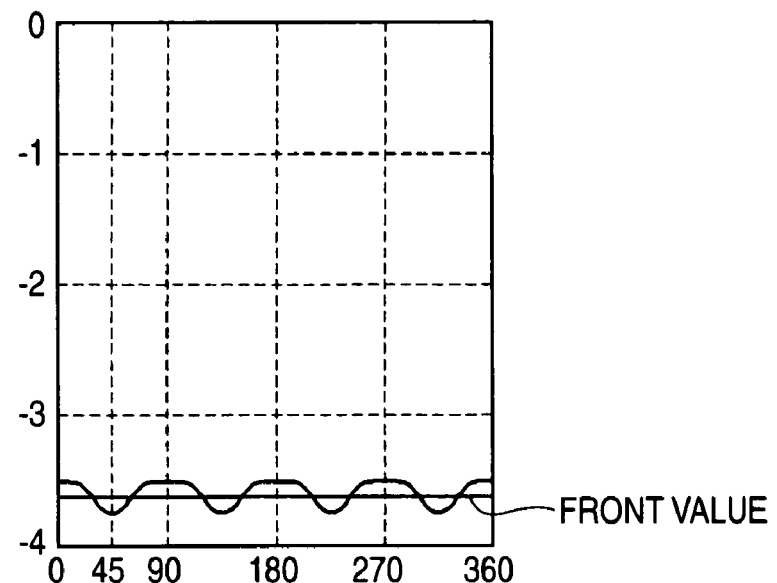
FIG. 9 is a view that illustrates a result of Comparative Simulation 3.
Figure 9:
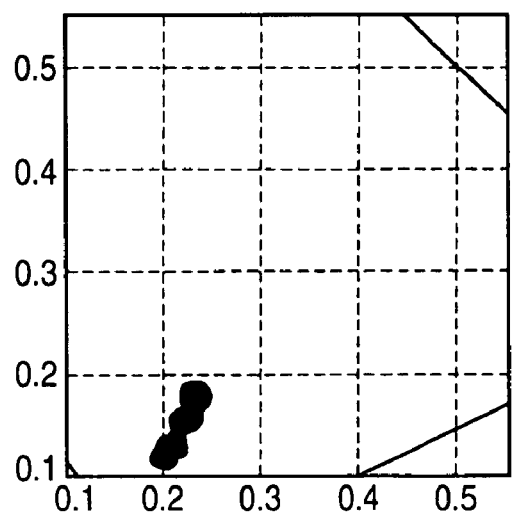

Comparative Simulation 3: In the liquid-crystal display device shown in FIG. 3B, the pre-tilt angle was set to 0°, and the retardation film 2c was omitted. Simulation was conducted on condition that the Nz value of the retardation film 2a is 0.75; $Re_1$ is 275 nm; and a total of Nz value is 1. A result of the simulation is shown in FIG. 9.

Figure 10:
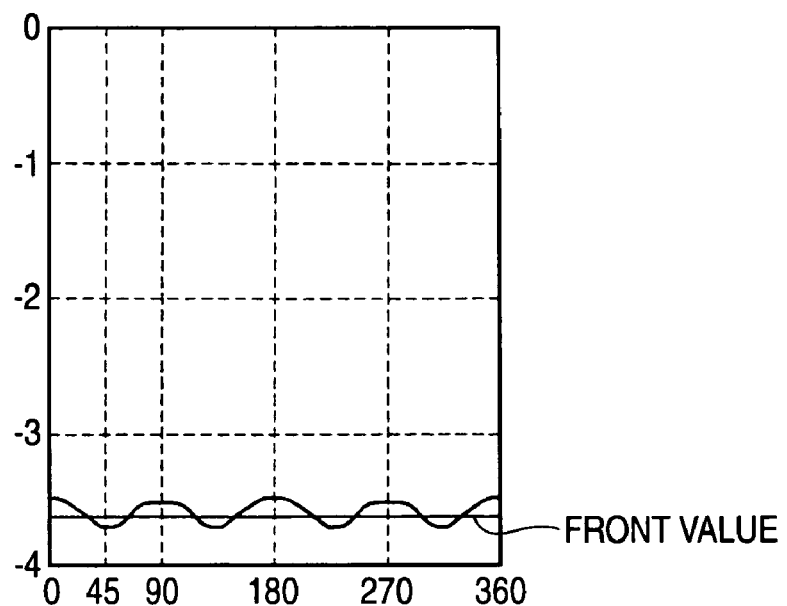
FIG. 10 is a view that illustrates the result of Simulation 1.
Figure 10:
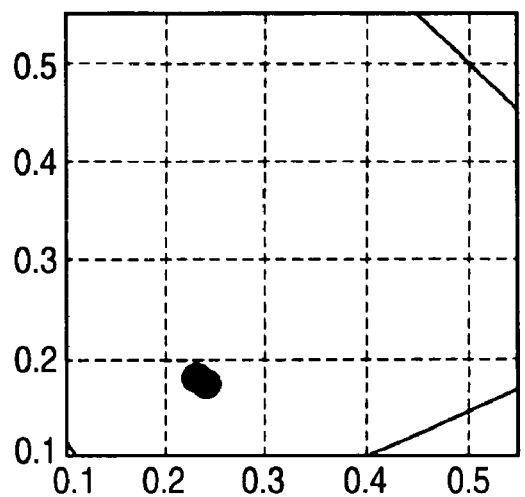

Simulation 1: In the liquid-crystal display device shown in FIG. 3B, simulation was conducted on condition that the pre-tilt angle was set to 0°; the Nz value of the retardation film 2a was set to 0.833; the Nz value of the retardation film 2b was set to 0.5; the Nz value of the retardation film 2c was set to 0.167; $Re_1$ of each of the retardation films was set to 275 nm; and the total of Nz values was 1.5. A result of the simulation is shown in FIG. 10.

Figure 11:
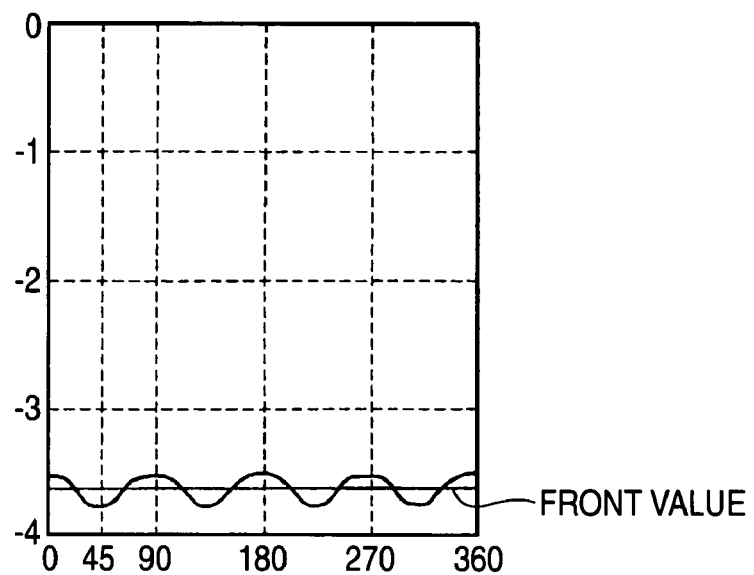
FIG. 11 is a view that illustrates the result of Simulation 2.
Figure 11:
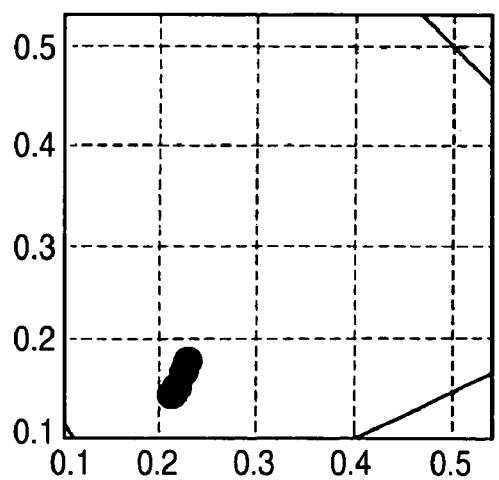

Simulation 2; In the liquid-crystal display device which is shown in FIG. 3B and was additionally provided with the retardation film 2d, simulation was conducted on condition that the pre-tilt angle was set to 0°; the Nz value of the retardation film 2a was set to 0.87; the Nz value of the retardation film 2b was set to 0.625; the Nz value of the retardation film 2c was set to 0.375; the Nz value of the retardation film 2d was set to 0.125; $Re_1$ of each of the retardation films was set to 275 nm; and the total of Nz values was 2. A result of the simulation is shown in FIG. 11.

Figure 12:
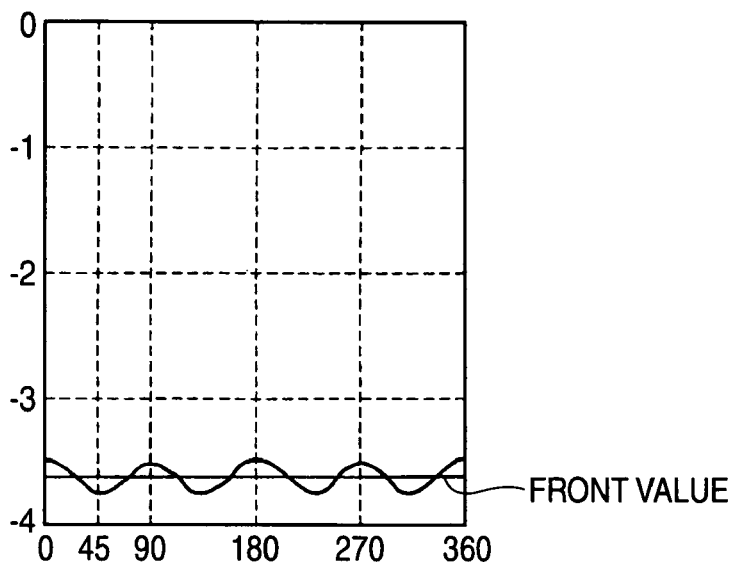
FIG. 12 is a view that illustrates the result of Simulation 3.
Figure 12:
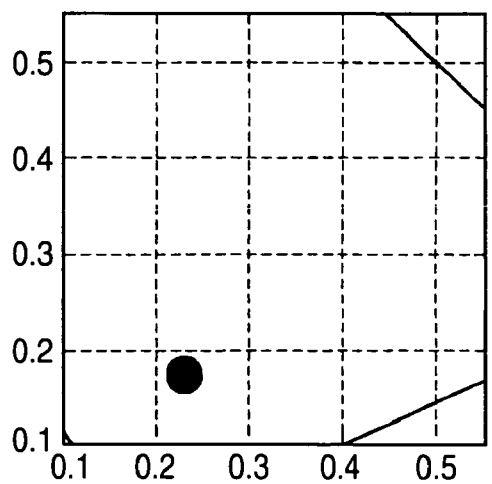

Simulation 3: In the liquid-crystal display device shown in FIG. 3B, simulation was conducted on condition that the pre-tilt angle was set to 0°; the Nz value of the retardation film 2a was set to 0.86; the Nz value of the retardation film 2b was set to 0.5; the Nz value of the retardation film 2c was set to 0.14; $Re_1$ of each of the retardation films was set to 275 nm; and the total of Nz values was 1.5. A result of the simulation is shown in FIG. 12.

Figure 13:
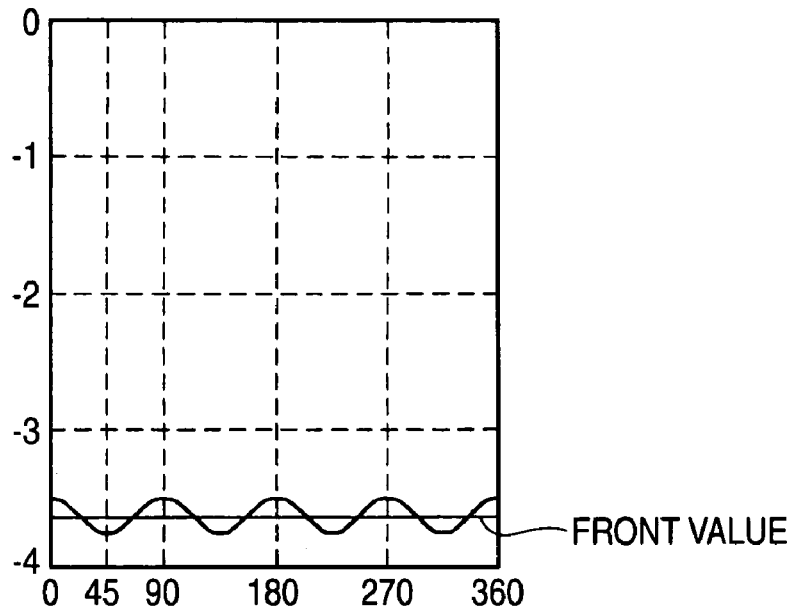
FIG. 13 is a view that illustrates the result of Simulation 4.
Figure 13:
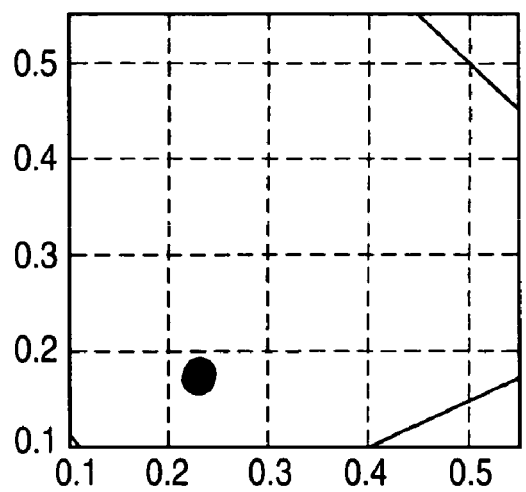

Simulation 4: In the liquid-crystal display device shown in FIG. 6B, simulation was conducted on condition that the pre-tilt angle was set to 0°; the Nz value of the retardation film 2a was set to 0.14; the Nz value of the retardation film 2b was set to 0.5; the Nz value of the retardation film 2c was set to 0.86; $Re_1$ of each of the retardation films was set to 275 nm; and the total of Nz values was 1.5. A result of the simulation is shown in FIG. 13.

Figure 14:
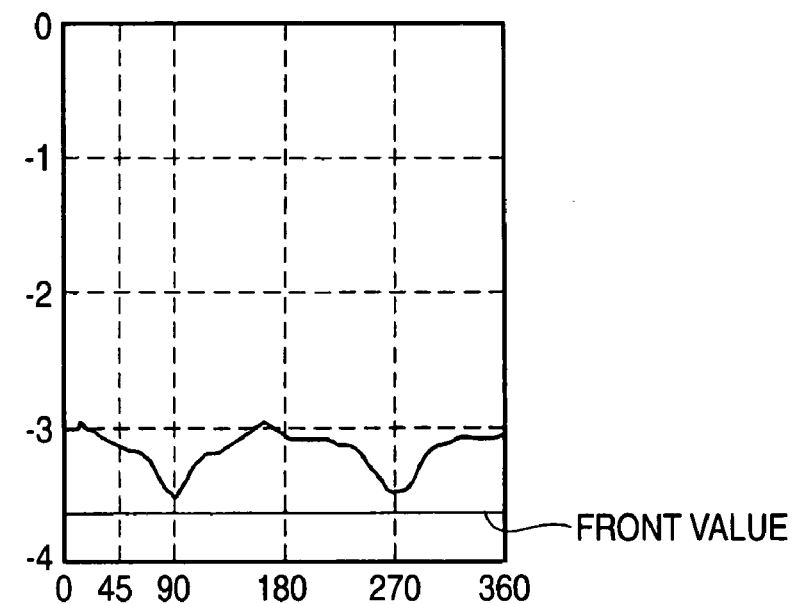
FIG. 14 is a view that illustrates a result of Comparative Simulation 4.
Figure 14:
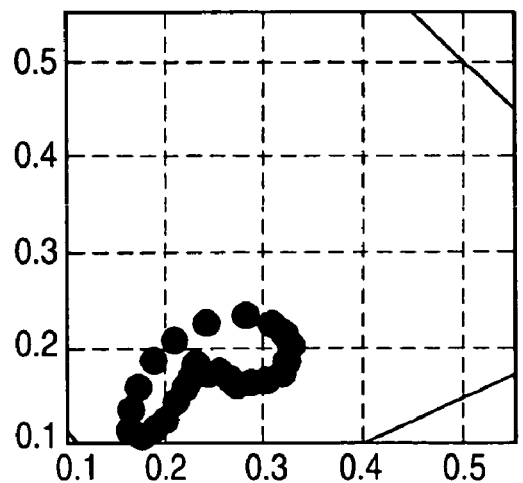

Comparative Simulation 4: In the liquid-crystal display device shown in FIG. 3B, the pre-tilt angle was set to 1.5°, and the retardation films 2b, 2c were omitted. Simulation was conducted on condition that the Nz value of the retardation film 2a is 0.5; $Re_1$ is 275 nm; and a total of Nz value is 0.5. A result of the simulation is shown in FIG. 14.

Figure 15:
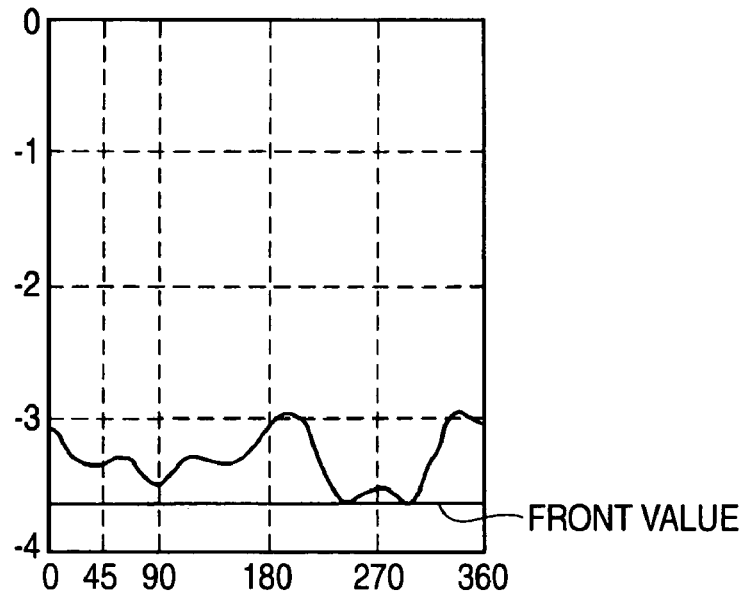
FIG. 15 is a view that illustrates a result of Comparative Simulation 5.
Figure 15:
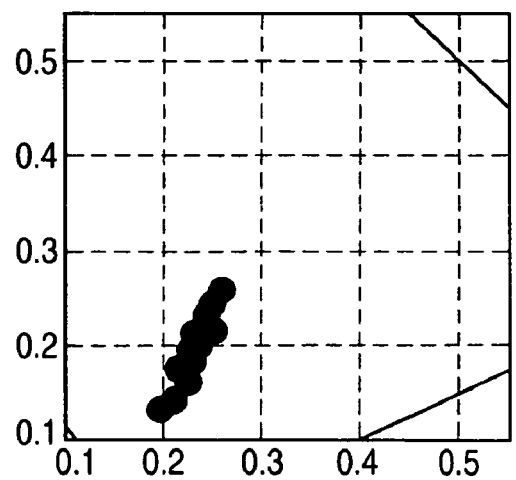

Comparative Simulation 5: In the liquid-crystal display device shown in FIG. 3B, the pre-tilt angle was set to 1.5°, and the retardation film 2c was omitted. Simulation was conducted on condition that the Nz value of the retardation film 2a is 0.75; the Nz value of the retardation film 2b was set to 0.25; $Re_1$ is 275 nm; and a total of Nz value is 1. A result of the simulation is shown in FIG. 15.

Figure 16:
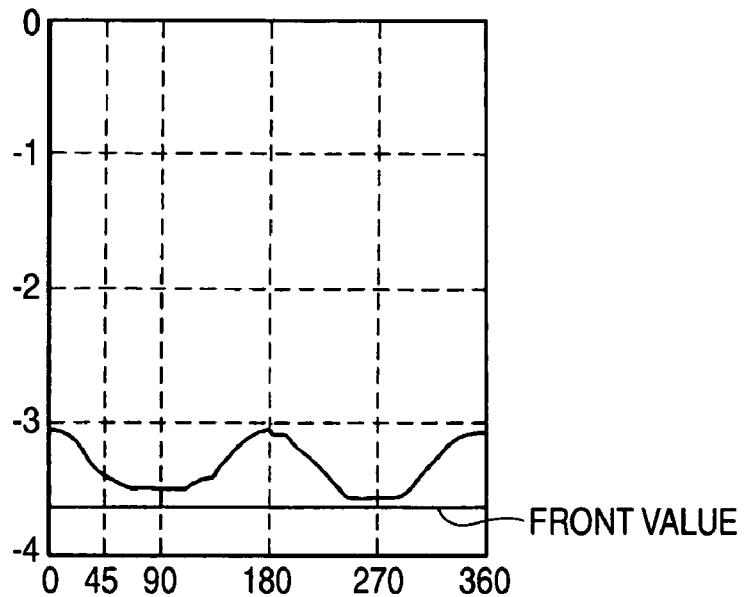
FIG. 16 is a view that illustrates the result of Simulation 5.
Figure 16:
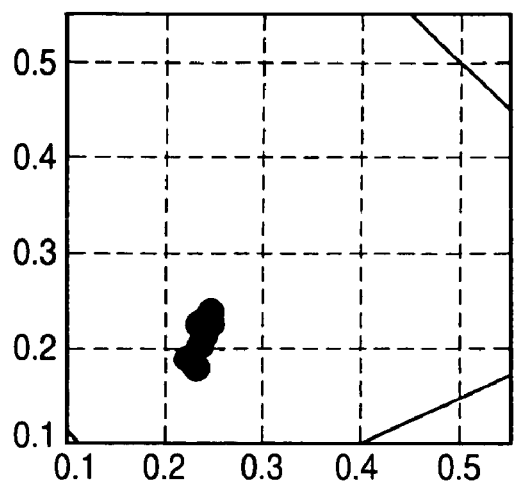

Simulation 5: In the liquid-crystal display device shown in FIG. 3B, simulation was conducted on condition that the pre-tilt angle was set to 1.5°; the Nz value of the retardation film 2a was set to 0.86; the Nz value of the retardation film 2b was set to 0.5; the Nz value of the retardation film 2c was set to 0.14; $Re_1$ of each of the retardation films was set to 275 nm; and the total of Nz values was 1.5. A result of the simulation is shown in FIG. 16.

Of the graphs shown in FIGS. 7 through 16, right-side graphs show an XY chromaticity chart, and left-side graphs show log values of brightness acquired at respective azimuth angles. The horizontal axis of the right-side graph depicts X, and the vertical axis of the same depicts Y. The horizontal axis of the left-side graph depicts an azimuth angle, and the vertical axis of the same depicts a log value of brightness.

FIGS. 9 to 13 show that the brightness values become closer to a front value (i.e., a value achieved when the front is viewed when compared with those shown in FIGS. 7 and 8; and that leakage of light arising when the screen is viewed from an oblique angle is small in quantity. Further, FIGS. 10 through 13 show that variations in tint fall within a smaller range when compared with that shown in FIG. 9; and that leakage of light arising when the screen is viewed from an oblique angle is small in quantity. The optical film used in Comparative Simulation 3 is essentially identical in structure with that employed in the first embodiment of Patent Document 1. Therefore, it is verified that the optical film of the present invention can much greatly suppress changes in tint than does the optical film described in Patent Document 1.

As shown in FIG. 15, in a state where the pre-tilt angle is set to 1.5°, the brightness value greatly deviates from the front value even in the case of the configuration such as that described in connection with the first embodiment of Patent Document 1, and tint also varies over a wide range. However, according to the present invention, as shown in FIG. 16, even when the pre-tilt angle is changed, the brightness level can be made closer to the front value, and variations in tint can be caused to fall within a narrow range.

The above descriptions have verified the effect of the present invention through the simulations. In the following descriptions, the effect of the present invention are verified through examples. The present invention is not limited to the examples which will be described below.

The refractive indices nx, ny, nc of the retardation films used for the optical film were measured by use of an automatic birefringence measuring apparatus (Oji Scientific Instruments, Automatic birefringence instrument KOBRA21 ADH), whereby the Nz values and the in-plane retardation $Re_1$ were computed. Similarly, the protective film for protecting the polarizer was measured, to thus have computed in-plane retardation $Re_2$ and thicknesswise retardation Rth.

FIRST EXAMPLE (Protective Films 1a, 1b)

75 parts by weight of an alternating copolymer consisting of isobutene and N-methylmaleimide (a content of N-methylmaleimide is 50 mol %) and 25 parts by weight of styrene-acrylonitrile copolymer having a content of 28 parts by weight of acrylonitrile were dissolved into methylene chloride, whereby an aqueous solution having a content of 15 parts by weight of solid was obtained. This solution was spread over a polyethylene terephthalate film laid on a glass plate, and was left for 60 minutes at room temperature. Subsequently, the film was exfoliated. After having been dried at 100° C. for ten minutes, the film was further dried at 160° C. for thirty minutes, whereupon protective films 1a, 1b, each of which has a thickness of 100 µm, were obtained. In-phase retardation $Re_2$ of each of the protective films 1a, 1c was 4 nm, and thicknesswise retardation Rth of the same was 4 nm.

(Polarizing Plate)

The protective films 1a, 1c were laminated on each surface of a polarizer (having a thickness of 20 µm), which was manufactured by causing a polyvinyl-alcohol-based film to adsorb iodine and spreading the thus-adsorbed film, by use of an adhesive, to thus manufacture the polarizing plate 1.

(Retardation Film)

The retardation films 2a, 2b, and 2c were prepared by means of stretching the polycarbonate film. The Nz value of the retardation film 2a was about 0.833; the Nz value of the retardation film 2b was about 0.5; and the Nz value of the retardation film 2c was about 0.167. The total of Nz values was essentially 1.5. In-plane retardation $Re_1$ of each of the retardation films 2a, 2b, and 2c was 275 nm.

(Optical Film)

As shown in FIGS. 1B and 1C, these materials were laminated by use of the adhesive, to thus have manufactured the two optical films 10.

(Liquid-Crystal Display Device)

Four liquid-crystal display devices, such as those shown in FIGS. 3 through 5, were manufactured by use of the thus-manufactured two optical films 10. The polarizing plate 3 was assumed to be identical with the polarizing plate 1. The liquid-crystal panel included in the liquid-crystal display device was assumed to fulfill conditions (rubbing anti-parallel treatment, and a pre-tilt angle of 0°) set in the simulations 1 through 5.

Observation was performed at a polar angle of 60° and an azimuth angle of 0 to 360° while the thus-manufactured four liquid-crystal display devices were brought into a black state. Even when the liquid-crystal display device was observed in any directions, leakage of light was small in quantity, and changes in tint were small in quantity.

SECOND EXAMPLE

The protective film and the polarizing plate, which are the same as those used in the first example, were used.

(Retardation Films)

The retardation films 2a, 2b, 2c, and 2d were prepared by means of stretching the polycarbonate film. The Nz value of the retardation film 2a was about 0.875; the Nz value of the retardation film 2b was about 0.625; the Nz value of the retardation film 2c was about 0.375; and the Nz value of the retardation film 2d was 0.125. The total of the Nz values was essentially 2. The in-plane retardation $Re_1$ of each of the retardation films 2a, 2b, 2c, and 2d was 275 nm.

(Optical Film)

As shown in FIGS. 2B and 2C, the materials were laminated by use of the adhesive, to thus have prepared the two optical films 20.

(Liquid-Crystal Display Device)

By use of the thus-prepared two optical films 20, four liquid-crystal display devices, such as those shown in FIGS. 3 through 5 (each having a structure where the retardation film 2d is sandwiched between the liquid-crystal panel 4 and the retardation film 2c), were manufactured. The polarizing plate 3 identical with the polarizing plate 1 was used. The liquid-crystal panel included in the liquid-crystal display device fulfilled the conditions set through the simulations 1 through 5 (the anti-parallel rubbing treatment and the pre-tilt angle of 0°).

Observation was conducted at a polar angle of 60° and an azimuth angle of 0 to 360° while the thus-manufactured four liquid-crystal display devices were held in a black display state. Even when the display devices were observed in any directions, leakage of light or changes in time were small in quantity.

THIRD EXAMPLE

The protective film and the polarizing plate, which are the same as those of the first example, were used.

(Retardation Films)

The retardation films 2a, 2b, and 2c were prepared by means of stretching the polycarbonate film. The Nz value of the retardation film 2a was about 0.86; the Nz value of the retardation film 2b was about 0.5; and the Nz value of the retardation film 2c was about 0.14. The total of the Nz values was essentially 1.5. The in-plane retardation $Re_1$ of each of the retardation films 2a, 2b, and 2c was 275 nm.

(Optical Film)

As shown in FIG. 1E, the materials were laminated by use of the adhesive, to thus have prepared the optical film 10.

(Liquid-Crystal Display Device)

By use of the thus-prepared optical film 10, two liquid-crystal display devices, such as those shown in FIGS. 3 and 4, were manufactured. The polarizing plate 3 identical with the polarizing plate 1 was used. The liquid-crystal panel included in the liquid-crystal display device fulfilled the conditions set through the simulations 1 through 5 (the anti-parallel rubbing treatment and the pre-tilt angle of 0°).

Observation was conducted at a polar angle of 60° and an azimuth angle of 0 to 360° while the thus-manufactured two liquid-crystal display devices were held in a black display state. Even when the display devices were observed in any directions, leakage of light or changes in time were small in quantity. When compared with the first and second examples, the present example shows a smaller quantity of leaked light and a smaller quantity of changes in tint.

FOURTH EXAMPLE

The protective film and the polarizing plate, which are the same as those of the first example, were used.

(Retardation Films)

The retardation films 2a, 2b, and 2c were prepared by means of stretching the polycarbonate film, The Nz value of the retardation film 2a was about 0.14; the Nz value of the retardation film 2b was about 0.5; and the Nz value of the retardation film 2c was about 0.86. The total of the Nz values was essentially 1.5. The in-plane retardation $Re_1$ of each of the retardation films 2a, 2b, and 2c was 275 nm.

(Optical Film)

As shown in FIG. 1C, the materials were laminated by use of the adhesive, to thus have prepared the optical film 10.

(Liquid-Crystal Display Device)

By use of the thus-prepared optical film 10, two liquid-crystal display devices, such as those shown in FIGS. 5 and 6, were manufactured. The polarizing plate 3 identical with the polarizing plate 1 was used. The liquid-crystal panel included in the liquid-crystal display device fulfilled the conditions set through the simulations 1 through 5 (the anti-parallel rubbing treatment and the pre-tilt angle of 0°).

Observation was conducted at a polar angle of 60° and an azimuth angle of 0 to 360° while the thus-manufactured two liquid-crystal display devices were held in a black display state. Even when the display devices were observed in any directions, leakage of light or changes in time were small in quantity. When compared with the first and second examples, the present example shows a smaller quantity of leaked light and a smaller quantity of changes in tint.

COMPARATIVE EXAMPLE 1

The optical film was prepared under the same conditions as those for preparation of the optical film 10 of the first example, except that the retardation film 2b was omitted. The manufactured two liquid-crystal display devices were held in a black display state, and observation was conducted at a polar angle of 60° and an azimuth angle of 0 to 360°. When compared with the first and second examples, the present example shows a larger quantity of leaked light and a large quantity of changes in tint.

COMPARATIVE EXAMPLE 2

The optical film was prepared under the same conditions as those for preparation of the optical film 10 of the third example, except that the retardation film 2b was omitted. The manufactured two liquid-crystal display devices were held in a black display state, and observation was conducted at a polar angle of 60° and an azimuth angle of 0 to 360°. When compared with the first and second examples, the present example shows a larger quantity of leaked light and a large quantity of changes in tint.

COMPARATIVE EXAMPLE 3

The optical film was prepared under the same conditions as those for preparation of the optical film 10 of the fourth example, except that the retardation film 2b was omitted. The manufactured two liquid-crystal display devices were held in a black display state, and observation was conducted at a polar angle of 60° and an azimuth angle of 0 to 360°. When compared with the first and second examples, the present example shows a larger quantity of leaked light and a large quantity of changes in tint. The present application claims foreign priority based on Japanese Patent Application (JP 2005-240967) filed Aug. 23 of 2006, the contents of which is incorporated herein by reference.

What is claimed is:

1. An optical film comprising:
    a polarizer having an absorption axis; and
    at least three retardation films, each having a slow axis, wherein
    the absorption axis of the polaration intersects the slow axis of each of the least three retardation films at right angles and is parallel to the slow axis of each of the at least three retardation films,
    the slow axis of each of the at least three retardation films are parallel to each other,
    a total amount of Nz value of each of the at least three retardation films, the Nz value being defined by formula (I), is half as many as the number of the at least three retardation films, and
    an in-plane retardation $Re_1$ of each of the least three retardation films, the in-plane retardation $Re_1$ being defined by formula (II), ranges from 200 to 350 nm:

$$Nz = (nx_1 - nz_1)/(nx_1 - ny_1) \quad (I)$$

$$Re_1 = (nx_1 - ny_1) \times d_1 \quad (II)$$

wherein, on condition that a direction in which the in-plane refractive index of each of the at least three retardation films is maximized is taken as an X axis; a direction perpendicular to the X axis is taken as an a Y axis; and a thickness-direction of the retardation films is taken as a Z axis, $nx_1$, $ny_1$, $nz_1$ are refractive index achieved along the X axis, the Y axis and the Z axis, respectively, and $d_1$ is a thickness of each of the at least three retardation films.

2. The optical film according to claim 1,
    wherein
    the at least three retardation films comprise the three retardation films,
    the absorption axis of the polarizer is parallel to the slow axis of each of the three retardation films, and
    the Nz value of the three retardation films ranges from 0.85 to 0.9, 0.4 to 0.6, and 0.1 to 0.15 in order from the polarizer.

3. The optical film according to claim 1,
    wherein
    the at least three retardation films comprise the three retardation films,
    the absorption axis of the polarizer intersects the slow axis of each of the three retardation films at right angles, and
    the Nz value of each of the three retardation films ranges from 0.1 to 0.15, 0.4 to 0.6, and 0.85 to 0.9 in order from the polarizer.

4. The optical film according to claim 1, which comprises:
    protective films that are transparent and oppose each other with the polarizer interposed therebetween; and
    each of the three retardation filsm are laminated on one of the protective films.

5. The optical film according to claim 4, wherein an in-plane retardation $Re_2$ of at least one of the protective films, the in-plane retardation $Re_2$ being defined by formula (III), is 20 nm or less, and a thickness-direction retardation $R_{th}$ of the protective films, the thickness-direction retardation $R_{th}$ being defined by formula (III), is 30 nm or less:

$$Re_2 = (nx_2 - ny_2) \times d_2 \qquad (III)$$

$$R_{th} = \{(nx_2 + ny_2)/2 - nz_2\} \times d_2 \qquad (IV)$$

wherein on condition that a direction in which an in-plane refractive index of each of the protective films is maximized is taken as an X axis; a direction perpendicular to the X axis is taken as a Y axis; and a thickness-direction of the protective film is taken as a Z axis, the Y axis and the Z axis, respectively, and $d_2$ is a thickness of each of the at least three retardation films.

6. The optical film according to claim 4, wherein each of the protective films are subjected to stretching treatment.

7. An image display device comprising:
an optical film according to claims 1; and
display unit that display an image.

8. A liquid-crystal display device of IPS mode, which comprises:
a liquid-crystal panel including a liquid-crystal substance;
an optical film according to claim 1, the optical film being provided in a display screen side of the liquid-crystal panel; and
a polarizer provided in a side of the liquid-crystal panel opposite the display screen,
wherein
in a state that no voltage is applied to the liquid-crystal panel, a direction of an anomalous refractive index of a liquid-crystal substance and the absorption axis of the polarizer are parallel to each other.

9. A liquid-crystal display device of IPS mode, which comprises:
a liquid-crystal panel including a liquid-crystal substance;
an optical film according to claim 1, the optical film being provided on a side of the liquid-crystal panel opposite the display screen; and
a polarizer provided on the display screen side of the liquid-crystal panel,
wherein
in a state that no voltage is applied to the liquid-crystal panel, a direction of an anomalous refractive index of a liquid-crystal substance and the absorption axis of the polarizer intersect at right angles.

* * * * *